United States Patent [19]

Whitney et al.

[11] Patent Number: 5,551,783
[45] Date of Patent: Sep. 3, 1996

[54] DRIVESHAFT CENTER BEARING ASSEMBLY WITH MOUNTING CHANNEL

[75] Inventors: Tim M. Whitney, Toledo; Anthony C. Dietsch, Sylvania, both of Ohio

[73] Assignee: Dana Corporation, Toledo, Ohio

[21] Appl. No.: 488,846

[22] Filed: Jun. 9, 1995

[51] Int. Cl.⁶ ........................ F16C 27/06
[52] U.S. Cl. ........................ 384/536
[58] Field of Search ............... 384/536, 582, 384/478

[56] References Cited

U.S. PATENT DOCUMENTS

| | | | |
|---|---|---|---|
| 832,296 | 10/1906 | Coggeshall | 248/74.1 |
| 2,102,415 | 12/1937 | Herreshoff | 384/536 |
| 2,114,670 | 4/1938 | Searles | 384/536 |
| 2,580,119 | 12/1951 | Meyers | 384/222 |
| 2,897,023 | 7/1959 | Burkhalter et al. | 384/536 |
| 2,935,362 | 5/1960 | Diener | 384/536 |
| 2,939,748 | 6/1960 | Leach | 384/536 |
| 3,037,573 | 6/1962 | Larsen | 180/381 |
| 3,047,345 | 7/1962 | Burton et al. | 384/536 |
| 3,140,901 | 7/1964 | Young | 384/536 |
| 3,306,679 | 2/1967 | Stokely | 384/536 |
| 3,639,015 | 2/1972 | Mass | 384/536 |
| 3,756,675 | 9/1973 | Mangiavacchi | 384/536 |
| 4,225,103 | 9/1980 | Pate | 248/74.3 |
| 4,392,694 | 7/1983 | Reynolds | 384/536 |
| 4,542,996 | 9/1985 | Brissette et al. | 384/536 |
| 4,722,618 | 2/1988 | Matsumoto et al. | 384/536 |
| 5,161,903 | 11/1992 | March | 384/536 |
| 5,172,985 | 12/1992 | Constancio | 384/582 X |

*Primary Examiner*—Thomas R. Hannon
*Attorney, Agent, or Firm*—MacMillan, Sobanski & Todd

[57] ABSTRACT

A center bearing assembly adapted to rotatably support a rotatable shaft on a vehicle frame includes a ball bearing adapted to rotatably support the rotatable shaft, a support member for supporting the ball bearing, a bracket adapted to hold the support member, and a mounting channel secured to the bracket for attaching the center bearing assembly to the vehicle frame, the mounting channel having a seating surface for seating the support member, and the mounting channel having at least one axial control member to limit axial movement of the support member within the bracket.

36 Claims, 4 Drawing Sheets

DRIVESHAFT CENTER BEARING ASSEMBLY WITH MOUNTING CHANNEL

BACKGROUND OF THE INVENTION

The invention relates in general to bearings for supporting shafts for rotation and in particular to an improved structure for a center bearing assembly for rotatably supporting an intermediate portion of a vehicle drive line or coupling shaft assembly.

In most rear wheel drive vehicles, a source of rotational energy, such as an internal combustion or diesel engine, is located near the front of the vehicle. The engine is connected by means of a drive line to rotate one or more driven wheels located near the rear of the vehicle. The drive line typically extends between a transmission, which is connected to the engine, and a differential, which is connected to the driven wheels. In some vehicles the distance separating the transmission and the differential is relatively short. In these vehicles, the drive line is composed of a single tube, usually referred to as the drive shaft. In other vehicles, the distance separating the transmission and the differential is relatively long, making the use of a single drive shaft impractical. In these vehicles, the drive line is composed of a drive shaft and one or more coupling shafts. The coupling shafts are connected to the drive shaft (and to each other) by universal joints.

Drive lines which are composed of a drive shaft and one or more coupling shafts require the use of one or more intermediate resilient support structures, which are generally referred to as center bearing assemblies. A typical center bearing assembly includes an annular ball bearing within which the coupling shaft is rotatably supported. The ball bearing itself is disposed within a generally annular resilient support member. The resilient support member is provided to reduce vibrations of the drive line in the vicinity of the center bearing assembly and to prevent such vibrations from being transmitted to the vehicle frame. The resilient support member is, in turn, disposed within a relatively rigid, generally U-shaped bracket which is attached to the vehicle frame, usually by securing the bracket to the lower surface of a cross member extending between the side rails of the vehicle frame.

In the past, the brackets supporting the resilient support member have been provided with orificed flanges which extend horizontally outwardly for attachment to the vehicle frame. The bolts placed through the flange orifices affix the bracket, and hence the center bearing assembly to the vehicle frame. Another design for the brackets for center bearing assemblies provides inwardly oriented flanges. This design is useful where tight space considerations prohibit the use of outwardly extending flanges.

Although the prior art attachment devices for center bearing assemblies have been satisfactory in the past, there is a need for center bearing assembly attachment devices which are easy to manufacture and are robust enough to withstand the rigors of modeern vehicle use. Also, the center bearing assembly should provide some means for limiting the axial movement of the support member within the bracket.

SUMMARY OF THE INVENTION

The invention relates to a center bearing assembly adapted to rotatably support a rotatable shaft on a vehicle frame. The center bearing assembly includes an annular ball bearing, which is adapted to receive and rotatably support the rotatable shaft, and a support member, such as a resilient rubber support member, which supports the ball bearing. A bracket contains the support member, and the bracket is attached to the frame of the vehicle with a mounting channel secured to the bracket. The mounting channel has a seating surface for seating the support member, and the mounting channel preferably has at least one axial control member to limit axial movement of the rubber support member within the bracket.

In a preferred embodiment of the invention, the mounting channel comprises a base wall and two sidewalls, and one or more nuts are mounted within the channel and attached to the base wall to enable the attachment of the center bearing assembly to the vehicle frame. By attaching the nuts to the mounting channel, preferably by welding, the nuts can be used to attach the center bearing assembly to the vehicle frame. The nuts can be welded to the base wall.

In a specific embodiment of the invention, the mounting channel comprises a base wall and two web sidewalls, and at least one of the sidewalls has a seating flange extending inwardly into the channel for seating the support member. In a different embodiment of the invention, the nuts mounted within the channel and attached to the base wall serve as the seating surface for seating the support member. In yet another embodiment of the invention, the base wall is the seating surface for seating the support member. The support member can be provided with recesses corresponding to the nuts so that the support member is seated on the base wall member rather than the nuts.

At least one of the sidewalls can be provided with a vertical flange which acts as an axial control member to limit axial movement of the support member within the bracket. Where the mounting channel and the bracket are welded together, both the mounting channel and the bracket can be steel members of substantially the same thickness to facilitate welding.

In another embodiment of the invention, the mounting channel is longitudinally symmetrical to enable the mounting channel to be assembled with the bracket in either of two orientations. This feature enables the bracket and mounting channel to be put together without having to worry about the orientation of the parts with respect to each other. Preferably, each of the sidewalls has a vertical flange which acts as an axial control member to limit axial movement of the support member within the bracket.

DETAILED DESCRIPTION OF THE PREFERRED EMBODIMENT

Figure 1:
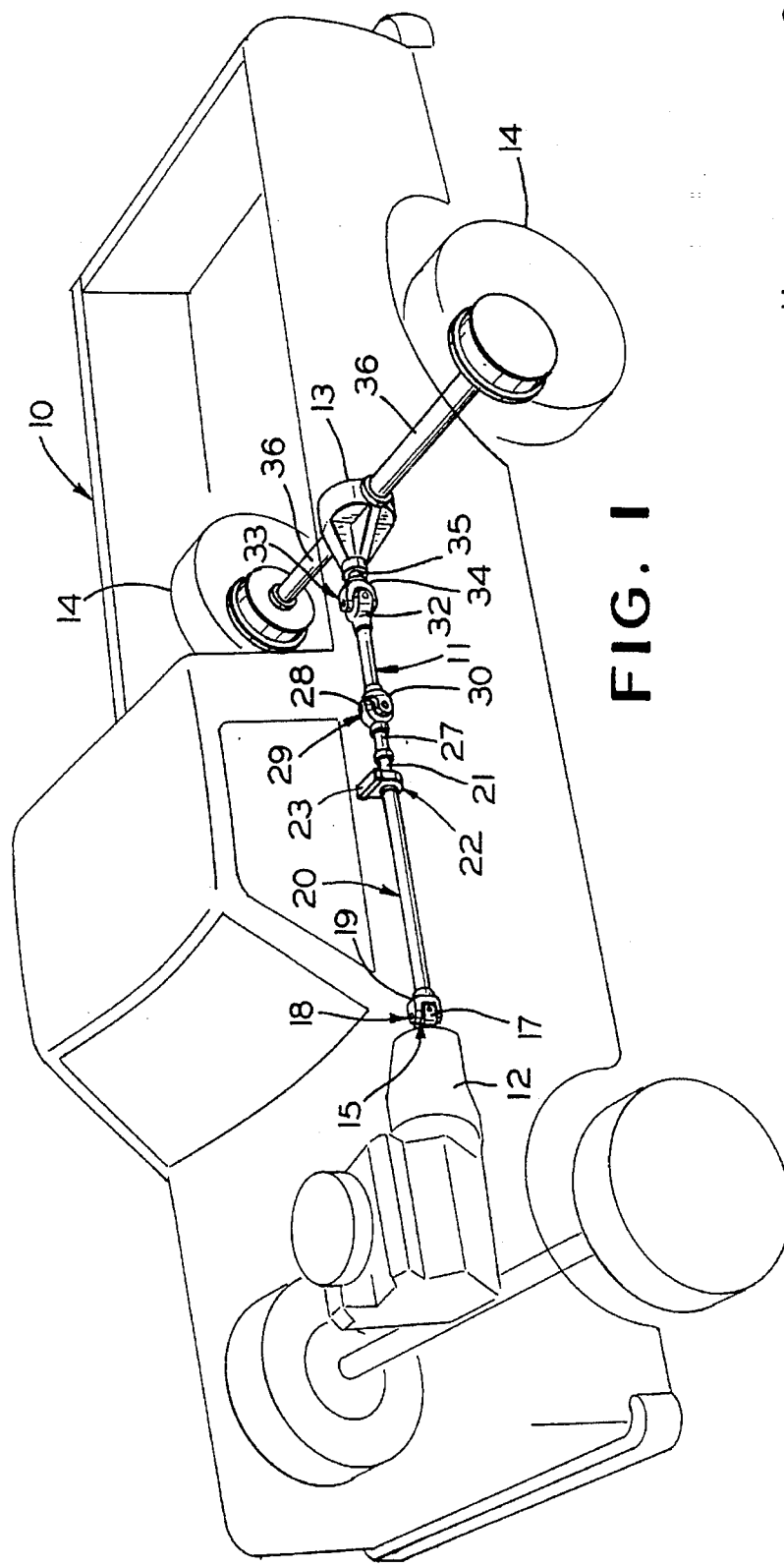
FIG. 1 is a perspective view of a vehicle showing the location of a center bearing assembly of the invention.
Figure 2:
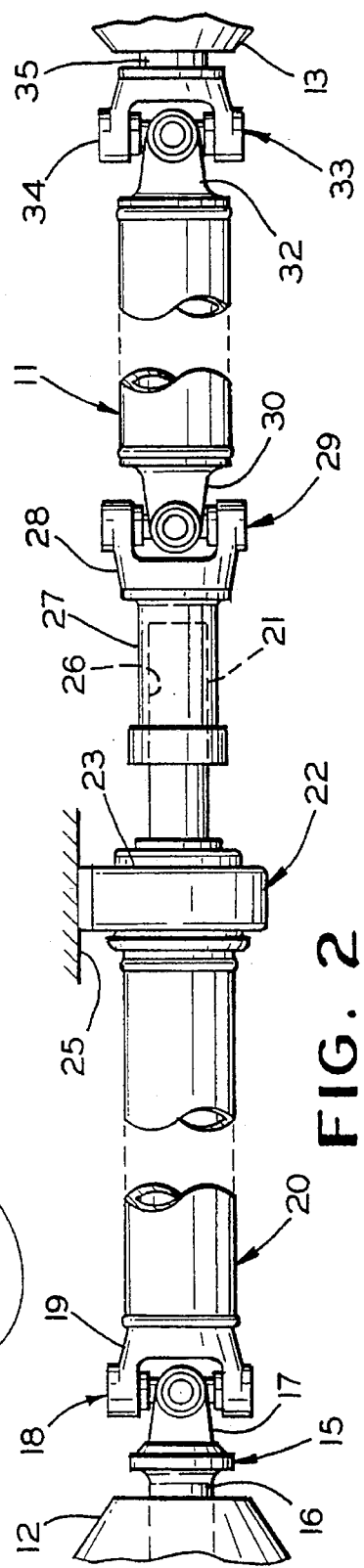
FIG. 2 is a side elevational view of a split driveshaft in a vehicle supported by the center bearing assembly of the invention.

As shown in FIGS. 1 and 2, a vehicle indicated generally at 10 includes a coupling shaft 20 and a drive shaft 11 connected between a transmission 12 and a differential gear 13 for driving a pair of rear wheels 14. The transmission 12 is provided with an output shaft (not shown) of conventional design and having a plurality of splines formed around its periphery and extending in a direction parallel with its axis. A slip yoke 15 has an internally splined tubular end portion 16 which slidably engages the transmission output shaft. The slip yoke 15 also has a yoke end 17 which forms one side of a universal joint 18. The other side of the universal joint 18 is formed by a yoke 19. The coupling shaft 20 has an opposite end terminating in a splined shaft portion 21. A center bearing assembly 22 in accordance with the present invention supports the coupling shaft 20 adjacent the splined shaft portion 21. The center bearing assembly 22 includes a rigid frame or bracket 23 which is rigidly attached to a vehicle frame, chassis or body 25.

The splined shaft portion 21 at the end of the coupling shaft 20 is received by an internally splined end portion 26 of a slip yoke 27 on the drive shaft 11. The splined shaft portion 21 and the splined end portion 26 move in an axial direction with respect to one another while rotating together. The slip yoke 27 has a yoke end 28 which forms a portion of a universal joint 29. A yoke 30 on drive shaft 11 forms a second portion of the universal joint 29. The drive shaft 11 has a second end terminating at a yoke 32 which forms a portion of a universal joint 33. A yoke 34 on a shaft 35 forms a second portion of the universal joint 33. The shaft 35 is connected to the differential gear 13 which is driveably connected through rear axle 36 to the rear wheels 14 of the vehicle 10. All of the above-described drive system apparatus is generally well known to those skilled in the art. U.S. Pat. No. 4,392,694 to Reynolds, owned by the assignee of this invention, discloses the general structure and operation of center bearing assemblies, and the disclosure of Reynolds is incorporated by reference.

Figure 3:
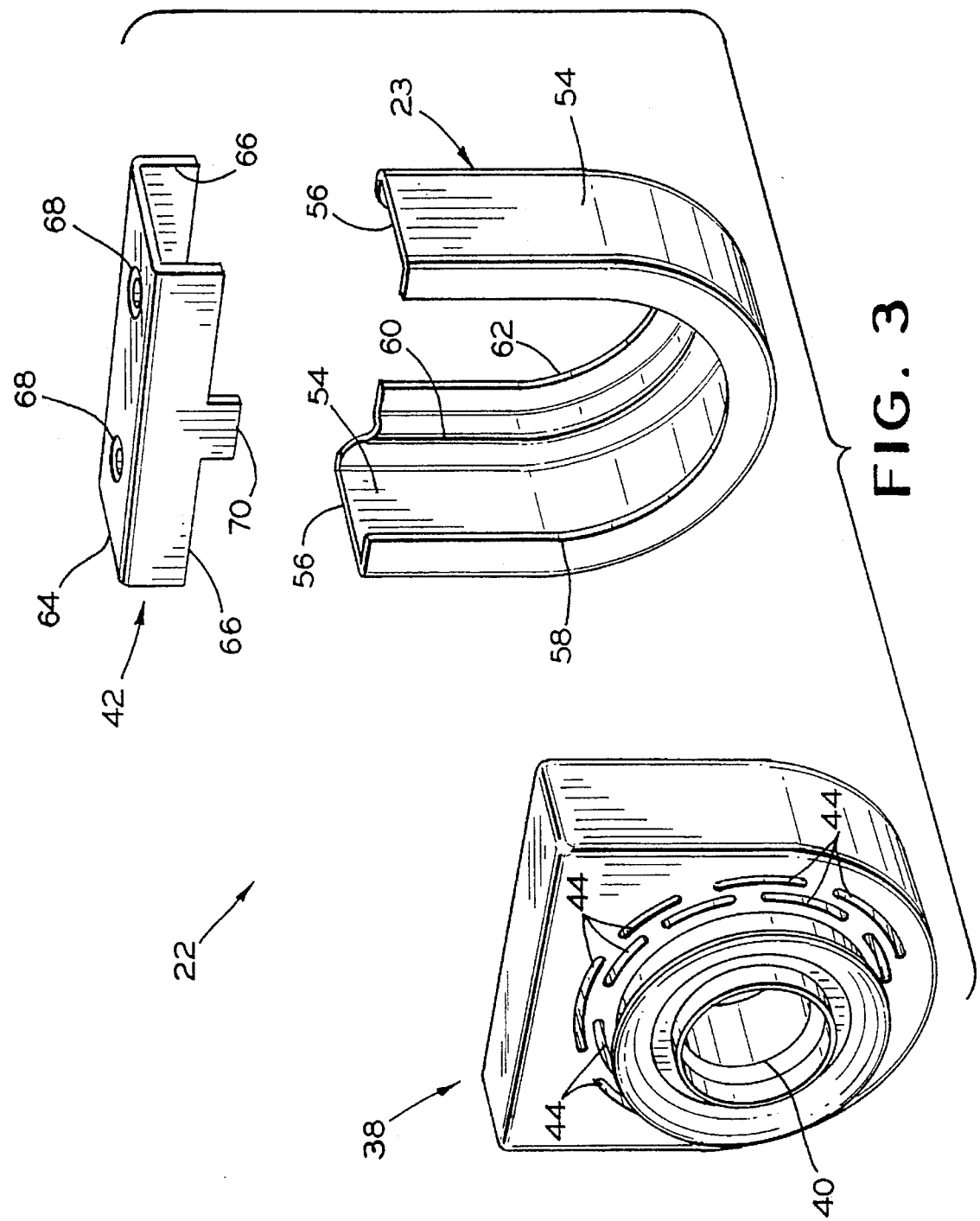
FIG. 3 is an exploded view of the center bearing assembly of the invention.
Figure 4:
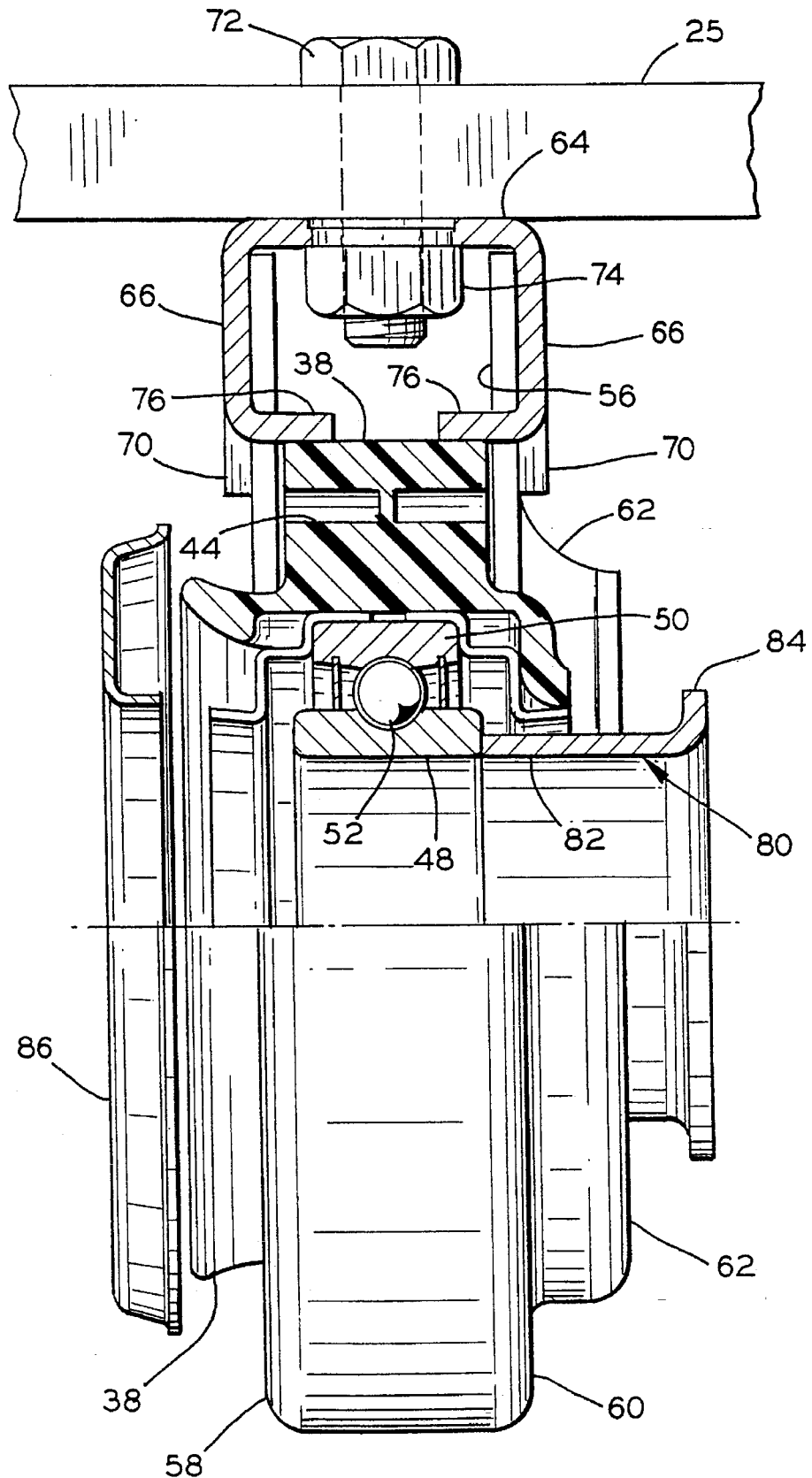
FIG. 4 is an enlarged view in elevation, partially in cross-section, of the center bearing assembly of the invention.

As shown in FIG. 3, the center bearing assembly 22 is comprised of three major parts, a support member 38 for supporting a ball bearing 40, the bracket 23 for containing the support member, and the mounting channel 42. These parts act together to rotatably support the coupling shaft 20. The support member is a bushing and can be of a semi-rigid rubber material. Preferably, the support member 38 is provided with a series of slots 44 which enable the coupling shaft 20 to have a small degree of relatively free radial movement. Support members of the type used in the invention are generally well known. Positioned within the support member is ball bearing 40 which can be any suitable bearing device for supporting the drive shafts of vehicles. As shown in FIG. 4, the ball bearing can be comprised of inner race 48, outer race 50 and balls 52.

The rubber support member is housed within bracket 23. The bracket has a U-shaped structure with two generally vertical legs 54 terminating at upper ends 56. The bracket also has an inwardly directed lip 58 on the forward side of the bracket, and rearwardly directed lip 60 on the rearward side. It can be seen that the forward and rearward lips define a containment space for the rubber support member. A rear flange 62 extends inwardly from the rear lip 60. The rearward spacing of the rear flange from the rearwardly directed lip 60 enables the rubber support member to avoid contact with the rear flange under normal operation of the vehicle.

The mounting channel 42 is adapted to fit together with ends 56 of the bracket. In general the channel has a base 64 and two webs or sidewalls 66. This channel-shaped structure provides the strength needed to securely mount the center bearing assembly to the vehicle frame. The mounting channel is preferably made of steel, although other materials can be used. In order to securely attach the bracket 23 to the mounting channel, the channel sidewalls 66 are preferably welded to the bracket ends 56. Ideally the bracket ends and the mounting channel sidewalls are of roughly the same steel material and of the same thickness to facilitate welding. A preferred method of welding is a metal inert gas weld.

The channel base 64 is provided with holes 68 through which bolts are passed to secure the center bearing assembly to the vehicle frame. Although two holes are shown, it is to be understood that any number of holes and any number of bolts can be used to secure the center bearing assembly to the vehicle frame. The sidewalls 66 of the mounting channel are provided with vertical encasing sidewall flanges 70 which act to control or limit axial movement of the rubber support member within the bracket. Other members suitable for controlling the axial movement of the rubber support member can be employed. It can be seen in FIG. 4 that the rubber support member 38 is blocked from axial movement by the sidewall flanges 70.

As shown in FIG. 4, the base wall 64 is attached to the vehicle frame 25 by at least one bolt 72. The bolt is threaded into a nut 74 which is secured to the base wall. The nut can be attached to the base wall by any suitable means, such as by welding.

Figure 5:
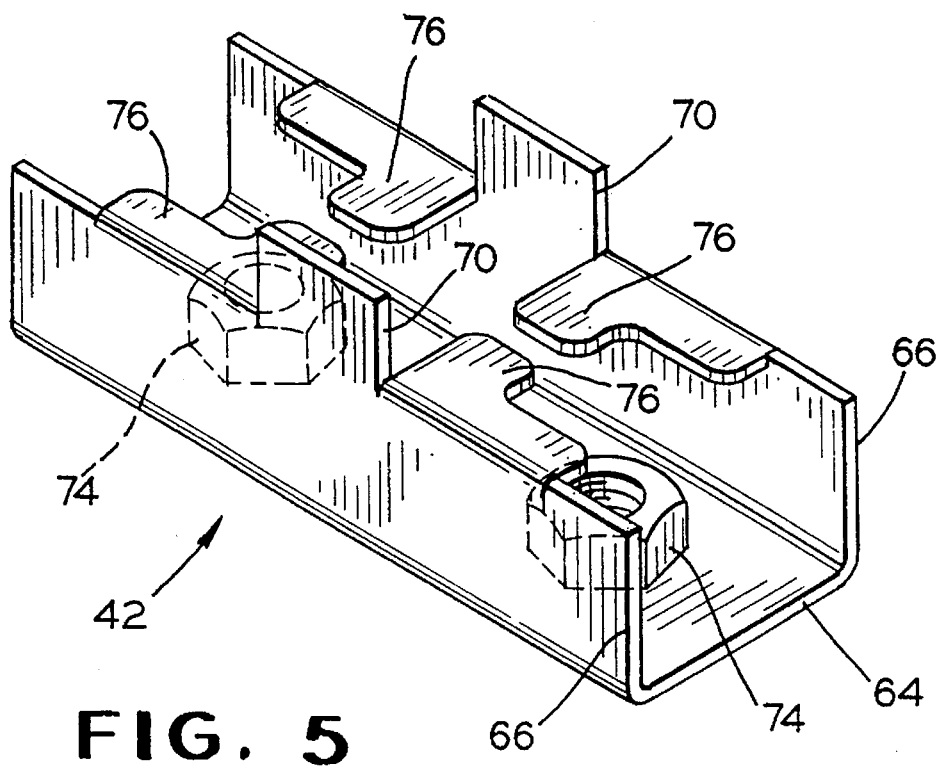
FIG. 5 is a perspective view of the mounting channel of the invention.

The mounting channel is provided with at least one seating surface for seating the rubber support member 38. The seating surface is a surface which the rubber support member contacts or abuts during normal operation of the center bearing assembly. As shown in FIG. 5, the preferred form of the seating surface is a set of seating flanges 76. The seating flanges provide a stop or limit for vertical, radial movement by the rubber support member. Preferably, the seating flanges are in the form of tabs extending horizontally inwardly from the channel sidewalls 66. As can be seen more clearly in FIG. 4, the seating flanges 76 limit the upward movement of the rubber support member. Ideally, the seating flanges are shaped so as not to cover the nuts 74 so that the nuts can more easily be welded into place.

Other forms of the seating surface can also be employed in accordance with the invention. For example, the mounting channel could be lacking the seating flanges, in which case the rubber support member would be contacting and abutting the nuts themselves. In another embodiment of the invention, the rubber support member contains recesses corresponding to the nuts so that the support member is seated on the base wall 64 rather than on the nuts. The nuts fit inside the recesses in the rubber support member, and the pressure from the rubber support member is applied to the base wall 64.

Figure 6:
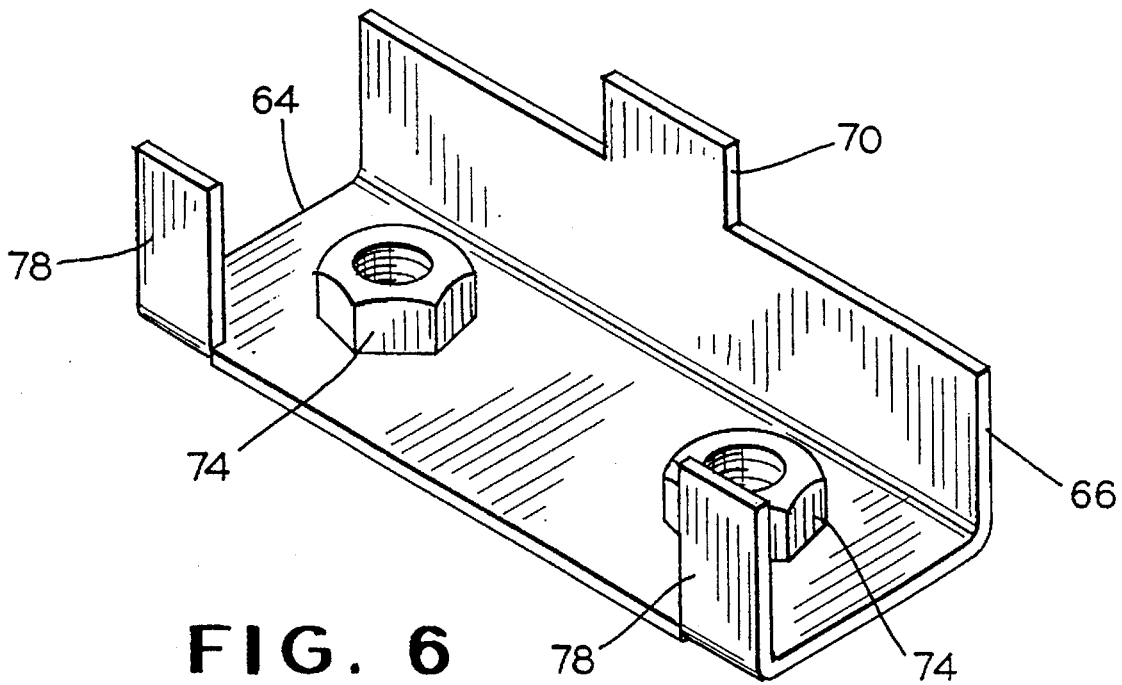
FIG. 6 is a perspective view of another embodiment of the mounting channel of the invention.

As shown in FIG. 6, the mounting channel need not be symmetrical, but can have a cutout channel sidewall 78 which is lower than the other channel sidewall 66. In this design the rubber support member is seated on the nuts 74. This design makes it easier to insert the rubber support member into the bracket after the bracket and mounting channel are welded together. There is only one sidewall flange 70 to restrict axial movement of the rubber support member.

In another aspect of the invention, a slinger 80 is provided in the center bearing assembly, as shown in FIG. 4. The purpose of the slinger is to prevent mud, water and dirt from reaching the bearing area. The slinger is also helpful in holding the ball bearing assembly in place. Centrifugal force generated by rotation of the slinger causes mud water and dirt to be thrown off and away from the center bearing assembly. The slinger is positioned rearwardly of the ball bearing. The slinger has a generally cylindrical portion 82 extending axially rearwardly from the ball bearing, and a lip or radially outwardly extending portion 84 at the rearward end of the slinger. Preferably, the radially outwardly extending portion 84 is spaced apart axially and rearwardly from the bracket by a distance which is at least twice the thickness of the rear flange 70 of the bracket. The center bearing assembly can also be provided with a dust slinger 86 at the forward end to keep contaminants from the rotating parts.

In accordance with the provisions of the patent statutes, the principle and mode of operation of this invention have been described in its preferred embodiment. However, it should be noted that this invention may be practiced otherwise than as specifically illustrated and described without departing from its spirit or scope.

What is claimed is:

1. A center bearing assembly adapted to rotatably support a rotatable shaft on a vehicle frame comprising:
    a ball bearing adapted to rotatably support the rotatable shaft;
    a support member supporting said ball bearing;
    a bracket holding said support member; and
    a mounting channel secured to said bracket for attaching the center bearing assembly to the vehicle frame, said mounting channel including a base wall and at least one sidewall, said base wall defining a seating surface for seating said support member.

2. The center bearing assembly defined in claim 1 wherein said mounting channel includes a base wall and two sidewalls.

3. The center bearing assembly defined in claim 2 wherein said sidewalls extend parallel to one another.

4. The center bearing assembly defined in claim 2 wherein said sidewalls are welded to said bracket.

5. The center bearing assembly defined in claim 4 wherein said mounting channel and said bracket are both steel members of substantially the same thickness.

6. The center bearing assembly defined in claim 2 wherein said mounting channel has at least one axial control member to limit axial movement of said support member relative to said bracket.

7. The center bearing assembly defined in claim 6 wherein each of said sidewalls has a vertical flange which acts as said axial control member to limit axial movement of said support member relative to said bracket.

8. The center bearing assembly defined in claim 2 wherein said mounting channel is longitudinally symmetrical.

9. The center bearing assembly defined in claim 1 wherein said sidewall is welded to said bracket.

10. The center bearing assembly defined in claim 1 further including means for attaching said mounting channel to the vehicle frame.

11. The center bearing assembly defined in claim 10 wherein said means for attaching includes an opening formed through said mounting channel which is adapted to receive a threaded fastener for attaching said mounting channel to the vehicle frame.

12. The center bearing assembly defined in claim 10 wherein said means for attaching includes a nut secured to said mounting channel which is adapted to receive a threaded fastener for attaching said mounting channel to the vehicle frame.

13. The center bearing assembly defined in claim 12 wherein said nut is said seating surface for seating said support member.

14. The center bearing assembly defined in claim 12 wherein said nut is welded to said base wall.

15. The center bearing assembly defined in claim 12 wherein said support member is formed having a recess which receives said nut so that said support member is seated on said base wall.

16. The center bearing assembly defined in claim 10 wherein said means for attaching includes an opening formed through said mounting channel and a nut secured to said mounting channel which is adapted to receive a threaded fastener extending through said opening for attaching said mounting channel to the vehicle frame.

17. The center bearing assembly defined in claim 16 wherein said mounting channel includes a base wall and two non-symmetrical sidewalls, one of said non-symmetrical sidewalls having a vertical flange which acts as an axial control member to limit axial movement of said support member relative to said bracket.

18. The center bearing assembly defined in claim 1 wherein said mounting channel has at least one axial control member to limit axial movement of said support member relative to said bracket.

19. The center bearing assembly defined in claim 18 wherein said sidewall has a vertical flange which acts as said axial control member to limit axial movement of said support member relative to said bracket.

20. The center bearing assembly defined in claim 18 wherein said sidewall includes a rear vertical flange which acts as said axial control member to limit axial movement of said support member within said bracket, said rear flange defining a thickness, said center bearing assembly further including an annular slinger positioned rearwardly of said ball bearing, said slinger having a generally cylindrical portion extending axially rearwardly from said ball bearing, said slinger having a radially outwardly extending portion at said rearward end of said slinger which is spaced apart rearwardly from said bracket by a distance which is at least twice said thickness of said rear flange of said mounting channel.

21. A center bearing assembly adapted to rotatably support a rotatable shaft on a vehicle frame comprising:
    a ball bearing adapted to rotatably support the rotatable shaft;
    a support member supporting said ball bearing;
    a bracket holding said support member; and
    a mounting channel secured to said bracket for attaching the center bearing assembly to the vehicle frame, said mounting channel including a base wall and at least one sidewall, said side wall including a flange defining a seating surface for seating said support member.

22. The center bearing assembly defined in claim 21 wherein said mounting channel includes a base wall and two sidewalls.

23. The center bearing assembly defined in claim 22 wherein said sidewalls extend parallel to one another.

24. The center bearing assembly defined in claim 22 wherein said sidewalls are welded to said bracket.

25. The center bearing assembly defined in claim 24 wherein said mounting channel and said bracket are both steel members of substantially the same thickness.

26. The center bearing assembly defined in claim 22 wherein said mounting channel has at least one axial control member to limit axial movement of said support member relative to said bracket.

27. The center bearing assembly defined in claim 26 wherein each of said sidewalls has a vertical flange which acts as said axial control member to limit axial movement of said support member relative to said bracket.

28. The center bearing assembly defined in claim 26 further including means for attaching said mounting channel to the vehicle frame.

29. The center bearing assembly defined in claim 28 wherein said means for attaching includes an opening formed through said mounting channel which is adapted to receive a threaded fastener for attaching said mounting channel to the vehicle frame.

30. The center bearing assembly defined in claim 28 wherein said means for attaching includes a nut secured to said mounting channel which is adapted to receive a threaded fastener for attaching said mounting channel to the vehicle frame.

31. The center bearing assembly defined in claim 28 wherein said means for attaching includes an opening formed through said mounting channel and a nut secured to said mounting channel which is adapted to receive a threaded fastener extending through said opening for attaching said mounting channel to the vehicle frame.

32. The center bearing assembly defined in claim 22 wherein said mounting channel is longitudinally symmetrical.

33. The center bearing assembly defined in claim 21 wherein said sidewall is welded to said bracket.

34. The center bearing assembly defined in claim 21 wherein said mounting channel has at least one axial control member to limit axial movement of said support member relative to said bracket.

35. The center bearing assembly defined in claim 34 wherein said sidewall has a vertical flange which acts as said axial control member to limit axial movement of said support member relative to said bracket.

36. The center bearing assembly defined in claim 34 wherein said sidewall includes a rear vertical flange which acts as said axial control member to limit axial movement of said support member within said bracket, said rear flange defining a thickness, said center bearing assembly further including an annular slinger positioned rearwardly of said ball bearing, said slinger having a generally cylindrical portion extending axially rearwardly from said ball bearing, said slinger having a radially outwardly extending portion at said rearward end of said slinger which is spaced apart rearwardly from said bracket by a distance which is at least twice said thickness of said rear flange of said mounting channel.

* * * * *